United States Patent [19] [11] 4,279,340
Lang [45] Jul. 21, 1981

[54] TWO-COMPONENT ADHESIVE CARTRIDGE

[75] Inventor: Gusztav Lang, Munich, Fed. Rep. of Germany

[73] Assignee: Hilti Aktiengesellschaft, Schaan, Liechtenstein

[21] Appl. No.: 107,551

[22] Filed: Dec. 27, 1979

[30] Foreign Application Priority Data

Dec. 29, 1978 [DE] Fed. Rep. of Germany ....... 2856735

[51] Int. Cl.³ ............................................. B65D 25/08
[52] U.S. Cl. ...................................... 206/219; 405/261
[58] Field of Search ............................... 206/219, 220; 405/259–261

[56] References Cited

U.S. PATENT DOCUMENTS

| 3,861,522 | 1/1975 | Llewell | 206/219 |
| 3,913,733 | 10/1975 | Flesch et al. | 206/219 |
| 4,103,771 | 8/1978 | Klatt et al. | 206/219 |
| 4,153,156 | 5/1979 | Seemann et al. | 206/219 |
| 4,227,612 | 10/1980 | Dillon | 206/219 |

Primary Examiner—George T. Hall

[57] ABSTRACT

A two-component adhesive cartridge includes a hardener component and a resin component kept separated from one another in a breakable or destructible container. The container is formed of a latticework frame covered with a binder to provide an imperforate enclosing wall for the container. The hardener component is incorporated into the enclosing wall. The resin component is filled into the container. A filler can be provided in the container.

8 Claims, 4 Drawing Figures

TWO-COMPONENT ADHESIVE CARTRIDGE

SUMMARY OF THE INVENTION

The present invention is directed to a two-component adhesive cartridge including a resin component, a hardener component and possibly a filler with at least the resin component held within a destructible container.

Two-component adhesives are often used for setting anchoring rods in rock, concrete, masonry or similar materials. Usually the adhesive components in separate destructible containers are inserted into a borehole formed in a material. Subsequently, the containers are broken, usually by means of the anchoring rod, and the components are mixed together. As a result, the mixture of the two components commences a reaction which leads to the hardening of the adhesive material.

A variety of containers have been used for enclosing the adhesive components. Tubes of glass or a brittle plastics material are used, especially when the container dimensions are small. The containers are closed by melting or by means of a cover. These tubular containers have the disadvantage, however, that they are very fragile and, as a result, are frequently damaged during transport or handling or are destroyed prematurely. There is a significant danger of injury to personnel in processing such adhesive cartridges.

To avoid these disadvantages, it has been suggested to fill the adhesive components into tubes or hoses of plastics material foil or the like and to close such tubes at their opposite ends. Such a packaging has the disadvantage that the adhesive cartridges do not have a stable shape and, therefore, difficulties frequently occur when the cartridges are inserted into the borehole.

To facilitate the insertion of tubular cartridges into a borehole and to protect them against damage during transport and handling, it has been suggested to place the adhesive cartridges formed of plastics foil or a brittle material inside a tubular member having a latticework or meshwork structure. The production of such an adhesive cartridge, however, is very expensive. There is the possibility that the cartridge may be damaged when it is inserted into the latticework or meshwork tubular member. Moreover, such tubular cartridges impair the mixing of the adhesive components in a borehole. It is possible, for example, that the empty sheath may be wrapped around the anchoring rod so that a connection between the hardening adhesive material and the surface of the anchoring rod cannot be attained.

Therefore, it is the primary object of the present invention to provide an adhesive cartridge which can be economically produced and is not likely to be damaged during handling.

In accordance with the present invention, a destructible container for the adhesive material is formed of a reticulated member, such as a latticework or meshwork frame with the openings through the frame being closed by a binder.

In accordance with the present invention, the latticework or meshwork frame has a holding and support function before the adhesive cartridge is inserted into a borehole. After the adhesive cartridge is inserted into a borehole and the adhesive components are mixed, the latticework or meshwork frame acts as a reinforcement for the hardening adhesive material which encloses the anchoring rod. Organic materials can be used as the binder, such as thermoplastic materials, for example, polyvinyl chloride (PVC), polymethacrylates (PMMA or plexiglass) or duromer materials such as alkyd resins. Further, gypsum may be used as the binder. The binder can be applied to the latticework frame in a simple manner such as in a dipping procedure. If the size of the openings in the latticework or meshwork frame is sufficiently small, the binder may be applied in a spraying operation. After the binder has hardened, the adhesive components can be filled into the destructible container so that they are maintained separate from one another.

To prevent any contact between the adhesive material components which would result in a premature initiation of the hardening procedure, it is beneficial if the hardener component is incorporated into the binder enclosing the latticework or meshwork frame. As a result, the adhesive components are maintained separate from one another by the binder. In one embodiment, the hardener component can be sprayed onto the latticework or meshwork frame or it can be applied to the frame in a dipping operation. Subsequently, the hardener component is covered by the binder and its contact with the resin component is prevented. The reticulated structure forming the latticework or meshwork frame can be formed by a wire netting.

In another advantageous embodiment, the hardener component is incorporated into the binder. The hardener component can be chemically bound in the binder or it can be embedded in the binder in the form of individual particles. Accordingly, the hardener component and the binder can be applied in a single operation. In such an embodiment there is the further advantage that the hardener is uniformly distributed so that, after the cartridge is set in place with only a short mixing period, a homogeneous mixture of the adhesive material can be obtained. Using this embodiment, it may not be necessary to rotate the anchoring rod as it is inserted so that the placing procedure is limited to a percussive movement.

In still another advantageous embodiment, the hardener component is incorporated into the latticework or meshwork frame. In such an arrangement the hardener component can be chemically bound into the latticework or meshwork frame or it can be embedded within it in the form of uniformly distributed particles. The binder covering the frame prevents any premature contact between the hardener component and the resin component. To facilitate the uniform distribution of the hardener component with the resin component, the latticework or meshwork frame can be constructed so that it disintegrates into small particles during the mixing procedure. Therefore, it is advantageous if the latticework or meshwork frame is formed of a brittle thermoplastic material, such as polyvinyl chloride (PVC), polymethacrylate (PMMA or plexiglass) or a duromer material, such as an alkyd resin.

The resin material can be filled directly into the destructible container. In such a case, however, the container must be absolutely tight to prevent the resin component from escaping and also to prevent any reaction of resin component with the atmosphere. To simplify filling the resin component into the container and to reduce the requirements for sealing the container, it is advantageous if the resin component is microencapsulated. Due to the presence of the binder, the size of the openings in the latticework or meshwork frame can be significantly larger than the size range of the microcapsules. Microencapsulation of the resin component has the further advantage, when an adhesive cartridge is damaged, that the entire contents do not flow out.

If necessary, a portion of the hardener component can also be placed within the destructible container. In such a case, the two components must be separated in a known manner. If the resin component is microencapsulated, however, additional separation of the components is unnecessary.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
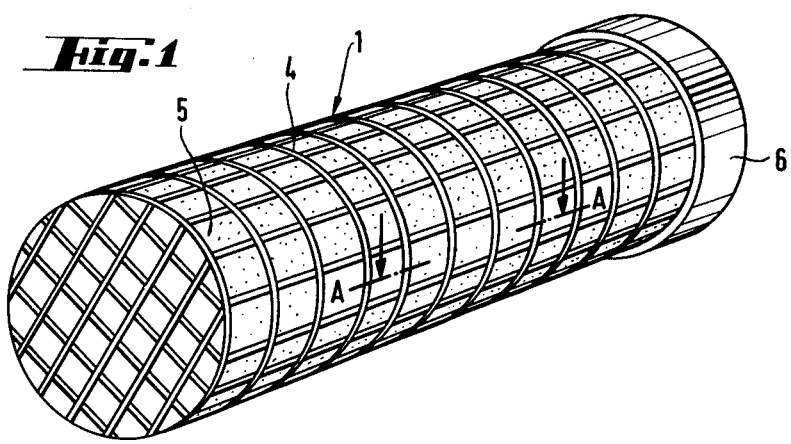
FIG. 1 is a perspective view of an adhesive cartridge incorporating a latticework or meshwork frame and embodying the present invention.

In FIG. 1 a container 1 is formed of a latticework or meshwork frame 4 with the openings through the frame closed by a binder 5. The binder can be applied onto the frame 4 by dipping it once or a number of times into the liquid binder 5. A cover 6 provides a closure for the container 1 after it has been filled with the adhesive components.

Figure 2:
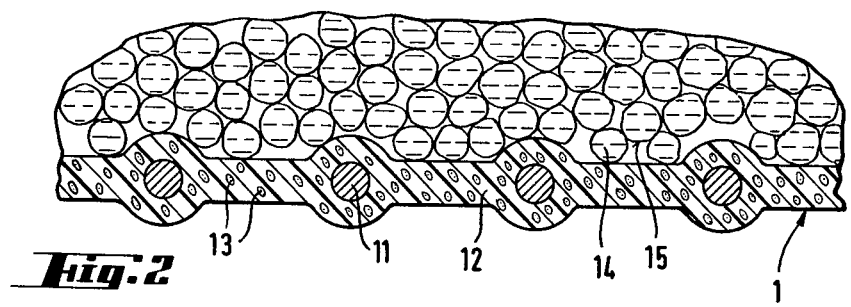
FIG. 2 is an enlarged sectional detail view of the adhesive cartridge in FIG. 1 taken along the line A—A.

In FIG. 2 a greatly enlarged detail view of the wall of container 1 is provided showing the latticework frame 11 enclosed by a binder 12. The binder fills in or closes the openings between the individual rod-like members which form the latticework frame 11. Hardener component 13 is distributed throughout the binder 12. The hardener component can be provided in the binder in the form of individual embedded particles or it can be chemically bound to the binder. Resin component 14 is microencapsulated and filled into the interior of the container 1. By microencapsulation, the resin component 14 is divided into a great number of small parts with each part being enclosed in a destructible capsule 15. With the resin components 14 being microencapsulated, it significantly simplifies the filling of the resin component into the container 1. Moreover, with the microencapsulation of the resin component, the requirements for the tightness of the container can be significantly reduced. Furthermore, when the hardener component 13 is embedded in the binder 12 in the form of individual particles, the microencapsulation prevents any contact of the resin component 14 with the particles of the hardener component 13 arranged at the surface of the binder 12. With the hardener component 13 arranged in the binder, the wall thickness of the binder can be selected relatively large, so that the binder can act as a filler after the container 1 has been destroyed.

Figure 3:
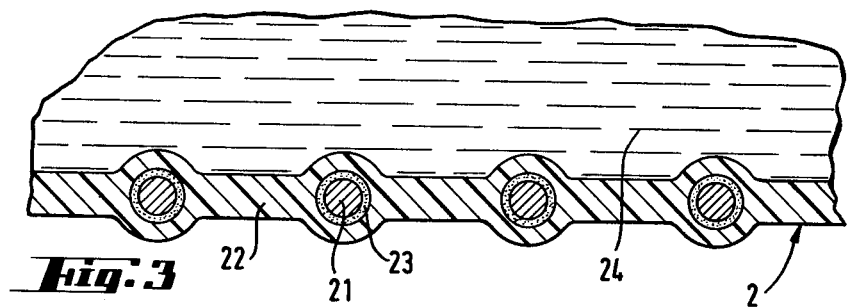
FIG. 3 is a sectional view, similar to FIG. 2, of the wall of a second adhesive cartridge embodying the present invention.

In the embodiment illustrated in FIG. 3, a latticework frame 21 is enclosed within a layer of a hardener component 23. The hardener component 23 can be applied in a dipping operation or by spraying on a liquified hardener component. Subsequently, the binder 22 is applied over the latticework frame 21 and the layer of hardener component 23 so that the hardener component is sealed and any premature contact with the resin component 24 in the interior of the component of the container 2 is prevented. The binder is destroyed and the hardener component 23 is brought into contact with the resin component 24 only during the placement procedure of the cartridge in a borehole.

Figure 4:
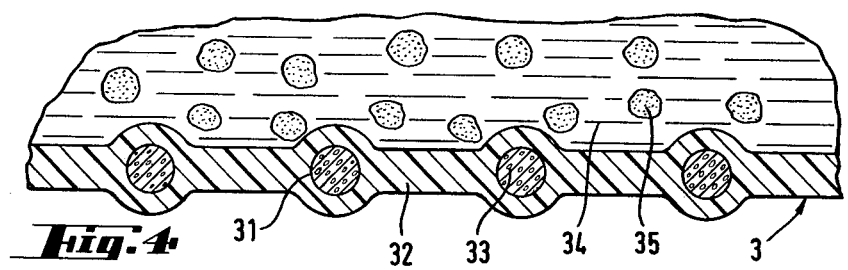
FIG. 4 is a sectional view, similar to FIGS. 2 and 3, of the wall of a third adhesive cartridge embodying the present invention.

In the embodiment displayed in FIG. 4 a container 3 is illustrated with a hardener component 33 incorporated directly within the latticework frame 31. Such incorporation can be used by chemically binding the hardener component or by embedding it in the form of suitable particles within the frame. A binder 32 covers the latticework frame 31 and fills in the openings through the frame. The binder 32 provides a divider separating the hardener component 33 from the resin component 34 filled into the container 3. Additional filler material 35 is provided within the resin component 34. In this embodiment, the latticework frame 31 is constructed so that, when it is destroyed during the placing operation, it is uniformly mixed with the resin component 34 and the filler material 35. Accordingly, the binder 32 acts as an additional filler material.

While specific embodiments of the invention have been shown and described in detail to illustrate the application of the inventive principles, it will be understood that the invention may be embodied otherwise without departing from such principles.

What is claimed is:

1. Two-component adhesive cartridge including a resin component and hardener component, a destructible container holding at least said resin component therein, wherein the improvement comprises that said destructible container includes a latticework frame having a plurality of openings therethrough, and a binder placed over said latticework frame covering said frame and closing the openings therethrough so that said latticework frame and binder form an imperforate wall for said container.

2. Two-component adhesive cartridge, as set forth in claim 1, wherein said hardener component encloses said latticework frame.

3. Two-component adhesive cartridge, as set forth in claim 2, wherein said hardener component is contained within said binder.

4. Two-component adhesive cartridge, as set forth in claim 1, wherein said latticework frame contains said hardener component therein.

5. Two-component adhesive cartridge, as set forth in claim 1, wherein microcapsules enclose said resin component within said container.

6. Two-component adhesive cartridge, as set forth in claim 1, wherein a filler material is included within said resin component.

7. Two-component adhesive cartridge, as set forth in claim 1, wherein said binder comprises one of the group of polyvinyl chloride, polymethacrylates, duromer materials, and gypsum.

8. Two-component adhesive cartridge, as set forth in claim 1, wherein said latticework frame is formed of one of the group of polyvinyl chloride, polymethyacrylate, and duromers.

* * * * *